United States Patent [19]

Krueger

[11] Patent Number: 5,027,604

[45] Date of Patent: Jul. 2, 1991

[54] HOT GAS OVERHEAT PROTECTION DEVICE FOR GAS TURBINE ENGINES

[75] Inventor: Wolfgang Krueger, Reichertshausen, Fed. Rep. of Germany

[73] Assignee: MTU Motoren- und Turbinen Union Munchen GmbH, Fed. Rep. of Germany

[21] Appl. No.: 293,574

[22] Filed: Jan. 3, 1989

Related U.S. Application Data

[63] Continuation of Ser. No. 46,584, May 6, 1987, abandoned.

[30] Foreign Application Priority Data

May 6, 1986 [DE] Fed. Rep. of Germany ....... 3615226

[51] Int. Cl.$^5$ .............................................. F02G 1/00
[52] U.S. Cl. ........................................ 60/752; 60/753; 415/9; 416/96 A
[58] Field of Search ................ 60/752, 753, 754, 755, 60/757; 415/9, 197; 416/96 A

[56] References Cited

U.S. PATENT DOCUMENTS

| | | | |
|---|---|---|---|
| 3,016,703 | 1/1962 | Lorett et al. | 60/752 |
| 4,087,199 | 5/1978 | Hemsworth et al. | 415/197 |
| 4,296,606 | 10/1981 | Reider | 60/754 |
| 4,302,941 | 12/1981 | DuBell | 60/757 |
| 4,380,896 | 4/1983 | Wiebe | 60/753 |
| 4,555,901 | 12/1985 | Wakeman et al. | 60/757 |

FOREIGN PATENT DOCUMENTS

| | | |
|---|---|---|
| 2554523 | 6/1976 | Fed. Rep. of Germany . |
| 3424345 | 1/1986 | Fed. Rep. of Germany . |
| 2102558 | 2/1983 | United Kingdom . |

Primary Examiner—Louis J. Casaregola
Assistant Examiner—T. Thorpe
Attorney, Agent, or Firm—Evenson, Wands, Edwards, Lenahan & McKeown

[57] ABSTRACT

A hot gas overheat protection device is provided for gas turbine engines and the like. An outer metal wall having cooling air supplied through cooling holes therethrough from the outside is shielded from hot gas flow by the provision of highly temperature resistant lining wall elements spaced from the metal wall. A thin metal skin is provided between the metal wall and the wall elements defining intermediate spaces communicating with cooling air ports in the metal wall. The thin metal skin has a melting point equal to or lower than that of the metal wall so as to provide for fusion or rupture of the thin metal skin in the event the insulating wall elements are locally ruptured, whereby the cooling air is provided through the cooling air ports in a direction against the flow of hot gases to thereby mitigate the effects of the rupture and protect the metal wall.

27 Claims, 7 Drawing Sheets

HOT GAS OVERHEAT PROTECTION DEVICE FOR GAS TURBINE ENGINES

This is a continuation of application Ser. No. 07/046,584, filed May 6, 1987, now abandoned.

BACKGROUND AND SUMMARY OF THE INVENTION

The present invention relates to a device for preventing the scorching of a hot-gas-wetted metal wall of a gas turbine engine or the like which is energized with cooling air and has cooling air holes communicating with intermediate spaces formed between a thin metal skin lining and the metal wall.

Combustion chambers of modern gas turbine engines, e.g., come under extremely high thermal loads, for the reason that high engine efficiency requires high combustion chamber exit or turbine inlet temperatures. In order to minimize the cooling effort for the combustion chamber wall, a clamshell construction as exemplified in DE-OS 34 24 345 has been selected that consists of a load-bearing structure (metallic outer shell) and an internal covering structure (e.g. shingle-shaped metallic or ceramic liner). Then when damage caused, e.g., by local overheating or material degradation or the like causes a metal shingle to partly fuse or a portion of a ceramic shingle to break off, the little-cooled metallic outer shell of the combustion chamber is directly exposed to the attack of hot combustion gases. This may cause the outer shell to scorch.

In order to mitigate the risk of the combustion chamber outer wall to overheat or scorch, it has already been proposed to provide the inner side of this component with a radiation-reflective layer in, e.g., silver or platinum (vapor plated).

It has also been proposed in connection with stationary gas turbine engines to fill the space between the outer wall of the combustion chamber and the inner liner with ceramic insulation and a metallic, resilient filler material.

In this manner and with this construction of the combustion chamber, however, the risk of scorching of the metallic outer wall in the train of damage or rupture of the inner shingle structure of the combustion chamber, could not be fully combatted, either.

In a broad aspect of the present invention a device of the initially cited generic category is provided for optimal overheat protection for the metallic structural component at relatively little cooling effort; this will largely minimize the risk of scorching the respective metallic structure as a result of damage to the liner structure that normally shields from the hot gases or combustion gases.

It is a particular object of the present invention to provide a device wherein the metal wall is shielded from the hot gas flow by at least one highly temperature resistant wall element, which together with the metal skin, includes at least one cavity, with the thin metal skin being of a material which is locally ruptured by hot gases upon the failure of the highly temperature resistant wall element thereby exposing the cooling air holes to the hot gas flow.

The present invention finds advantageous use not only with combustion chambers of gas turbine engines, but can be used wherever metallic outer component structures, such as casing component structures in the radially spaced-apart vicinity of other liners, are exposed to extremely high temperatures from hot gases as, e.g., with turbine rotor blade shells which are conventionally cooled with air taken from the compressor exit (impingement cooling systems), where the shell section immediately adjacent to the rotor blade tips is exposed to extremely high temperature effects.

The invention is suitable also for use in afterburners of gas turbine engines, in which extremely high combustion temperatures occur, so that also in this environment the metallic outer tail pipe structure can be lined with an internal shingle- or scale-like liner.

The invention can be used to advantage also with cooled stator vanes or rotor blades of gas turbine engines, i.e. with blade concepts, in which the cooling air is blown from one or several internal blade cavities and through one or several rows of impingement cooling holes in a metallic inner wall against highly temperature-jeopardized wall sections of the outer blade shell, where said extremely highly temperature-jeopardized blade shell sections are represented especially by the blade leading and trailing edge portions.

When referred to, e.g., the combustion chamber of a gas turbine engine the object of the present invention is advantageously represented in design and effect as follows: The outer load-bearing structure of the combustion chamber consists of a metallic outer shell provided with a plurality of small radial holes of one or several internal sheet metal components of thin section. The thin metal skin is locally positively connected to the load-bearing structure, but is in wide areas radially spaced apart from the outer shell.

The thin metal skin prevents the admission of air into the combustion chamber through the many small radial holes. In accordance with the present invention the melting point of the metal skin material is equal to or lower than that of the outer shell. Then when a metal or ceramic shingle is damaged, the hot combustion gases first impinge on the thin-walled metal skin. This area of the metal skin overheats and melts. This exposes a number of radial holes in the outer shell. The compressor air flows through these holes and into the combustion chamber, intensively cooling the load-bearing structure in the vicinity of the damaged shingle and simultaneously keeping the hot combustion gases away from the outer shell. At the next inspection of the combustion chamber the defective shingle and/or a portion of the metal skin will be replaced.

Other objects, advantages and novel features of the present invention will become apparent from the following detailed description of the invention when considered in conjunction with the accompanying drawings.

FIG. 1 illustrates the invention in elevation view and partly broken-away representation of an annular combustion chamber flame tube section, FIG. 2 is an enlarged view illustrating the broken-away detail view x of FIG. 1, FIG. 3 is a first variant on the enlarged detail of FIG. 1, FIG. 4 is a second variant on the enlarged detail of FIG. 1, FIG. 5 is a developed view taken at line A—A of FIG. 2, FIG. 6 is a detail view of FIG. 2 to elucidate the effects of the invention, FIG. 7 illustrates inventive details by way of a turbine engine tail pipe shown in longitudinal section, FIG. 8 is a detail view similar to that of FIG. 6 to elucidate the effects of the invention, but here with reference to the afterburner of FIG. 7, FIG. 9 illustrates the effects of the invention by way of a turbine rotor blade shell shown in selective view and again in longitudinal section, and FIG. 10 illustrates a turbine rotor blade with inventive details in lateral view with parts broken away along the entire height of the blade shell in radial section.

DETAILED DESCRIPTION OF THE DRAWINGS

Figure 1:
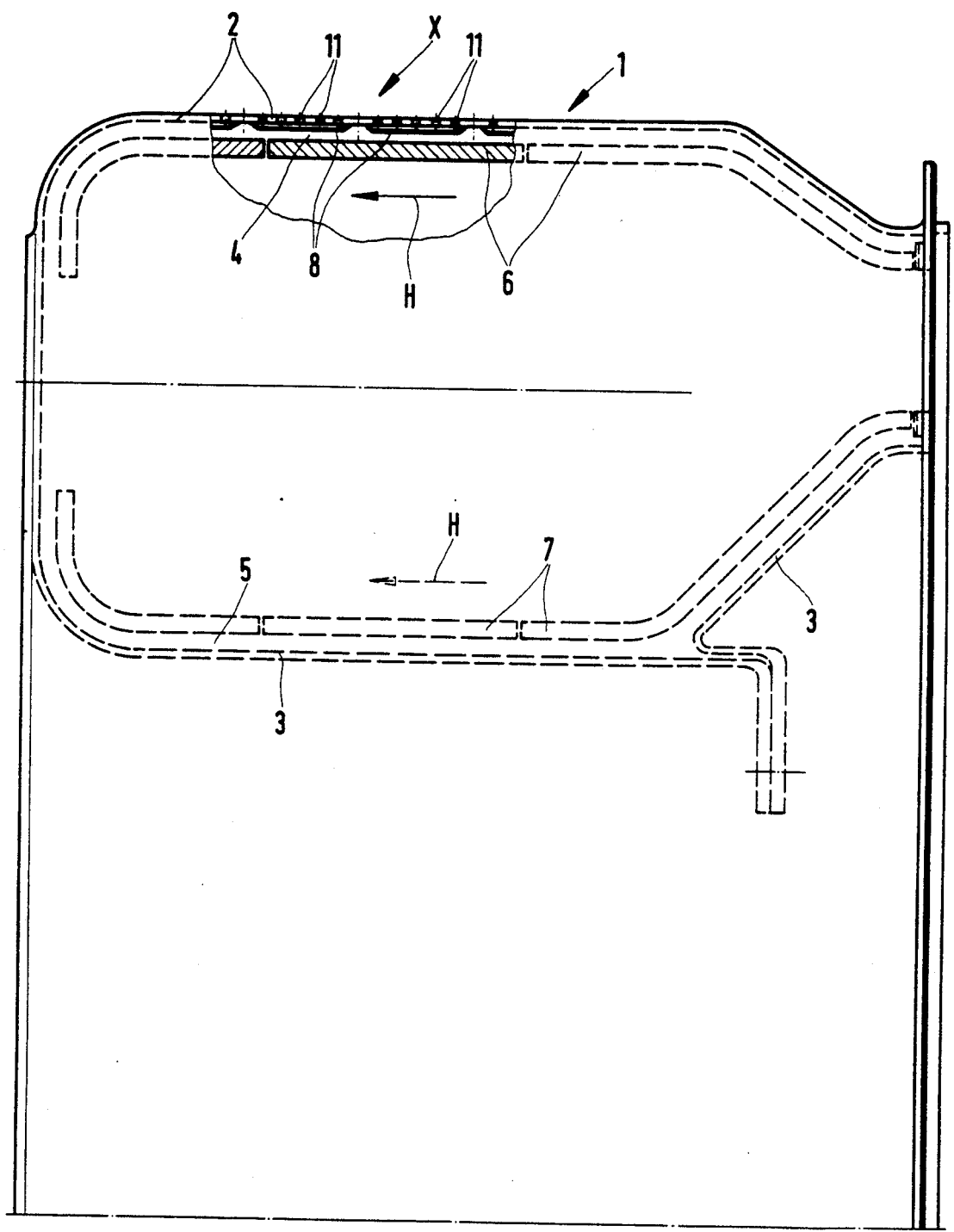

With reference now to FIG. 1 the inventive hot gas overheat protection device is illustrated for the flame tube 1 of an annular combustion chamber of gas turbine engines, where an outer 2 and an inner 3 annular metal wall are shielded from the hot gas flow H by outer and inner wall elements 6, 7 with cavities 4, 5 being included between them; the metal walls 2, 3 are energized with cooling air taken from the compressor; in accordance with detail X of FIG. 1 the outer metal wall 2 is lined within the cavity 4 with a thin metal skin 8, which in conjunction with the outer metal wall 2 includes intermediate spaces 9, 10 (FIGS. 2 to 4), which in turn communicate with cooling air ports 11 in the metal wall 2; where the metal skin has a melting point equal to or lower than that of the metal wall 2.

The outer and inner wall elements 6, 7 are manufactured in the form of shingle- or scale-like hot gas shield elements of a highly temperature-resistant metallic or ceramic material.

The ceramic materials contemplated for the wall elements 6, 7 are, e.g., hot-pressed or self-sintered silicon carbide or conceivably reaction-sintered silicon nitride.

The metallic materials contemplated for the thin metal skin 8 or the metallic version of the wall elements are, e.g., scale- and temperature-resistant materials like, e.g., a nickel-base alloy.

With reference to FIGS. 1 to 4, the metal walls 2, 3 are load-bearing outer or inner walls of the flame tube 1 and are energized with cooling air taken from the high-pressure compressor exit through an outer, e.g. 12 (FIGS. 3 and 4), or inner annular secondary air duct formed between outer casing structure components and the flame tube 1.

In accordance with the present invention the inner hot gas shield is axially and/or circumferentially broken down into several individual wall elements arranged with spaces (e.g. axial spaces 13, FIGS. 2, 3 and 4) allowed between adjacent abutment edges.

As it will also become apparent from FIGS. 1 to 4 the individual inner wall elements 6, 7 can follow the respective contour of the flame tube and so take a straight or vaulted shape. The wall elements 6, 7 can be inserted axially in circumferential slots, although this is not shown on the drawings, where the circumferential slots are arranged on radially projecting webs, which in turn can be integral parts of the respective outer and inner, load-bearing metallic walls 2, 3 (FIG. 1).

As it will further become apparent from FIGS. 2 to 5, each intermediate space 9, 10 is associated with a separate perforated section 14, 15 provided with cooling air holes 11. In accordance with FIG. 5 these perforated sections 14, 15 can be, e.g., rectangular and equally spaced, with the latter applying also to the respective intermediate spaces 9, 10.

In a further aspect of the present invention said thin metal skin 8 is positively connected along the imperforated sections 16 (FIG. 5) to the respective metal wall 2 or 3.

Figure 2:
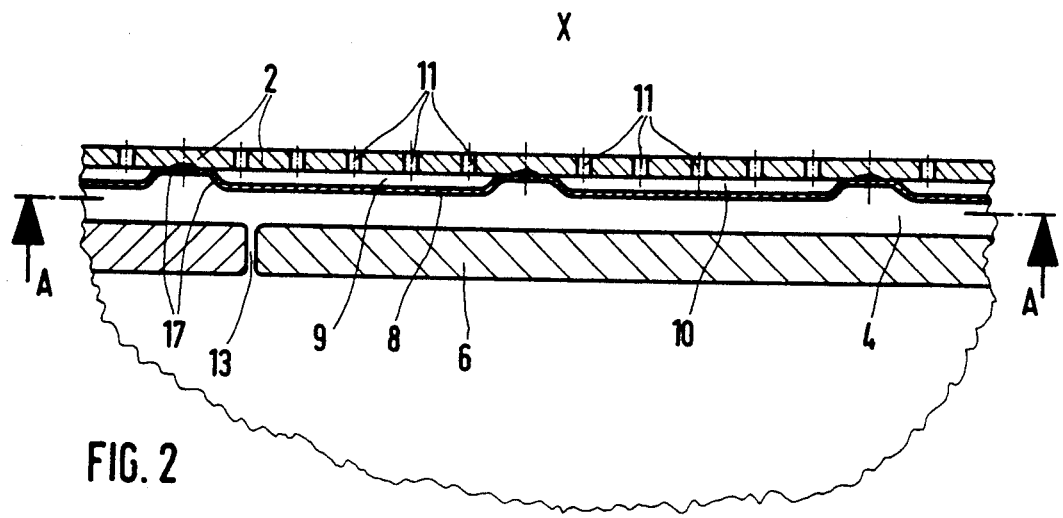

As shown in FIG. 2 the metal skin 8 can be connected to the imperforated sections 16 of, e.g., the outer wall 2 through local outwardly bent portions 17.

Figure 3:
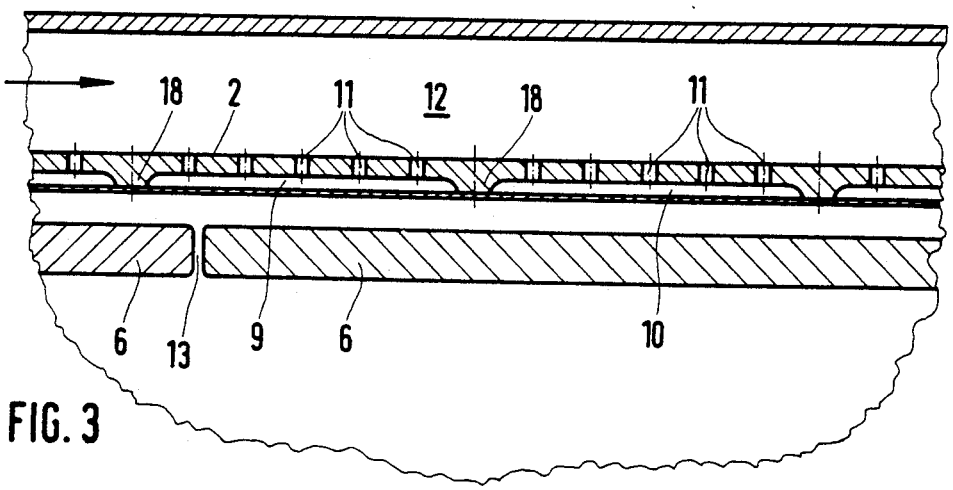

In accordance with FIG. 3 the metal skin 8 can be connected to the respective metal wall along internally projecting web ends (webs 18).

Figure 4:
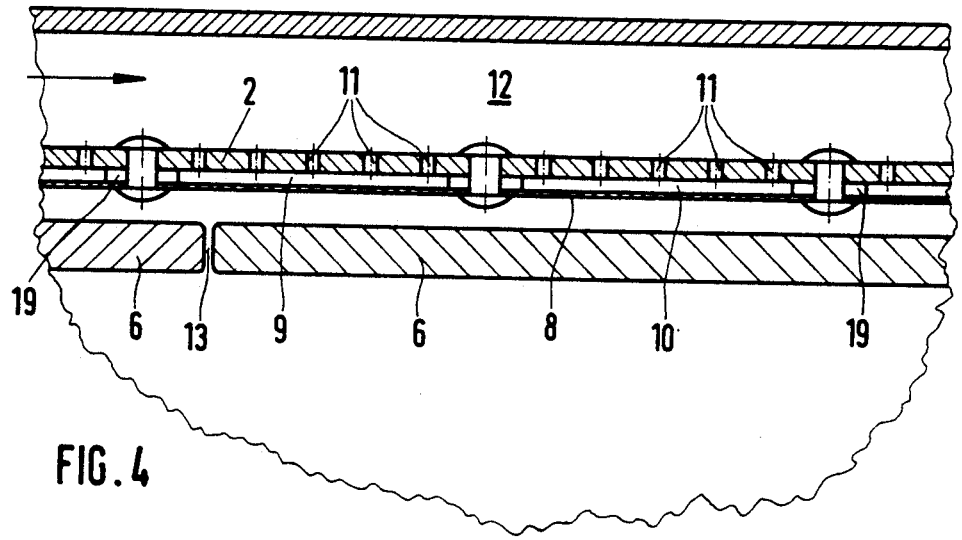

In accordance with FIG. 4 the metal skin 8 can be connected to the respective metal wall 2 by the intermediacy of spacer plates or strips 19. The strips 19 form the lateral boundary of the intermediate spaces 9, 10.

The metal skin 8 can also be welded (FIG. 2), brazed (FIG. 3) or riveted (FIG. 4) to the respective metal wall.

Figure 6:
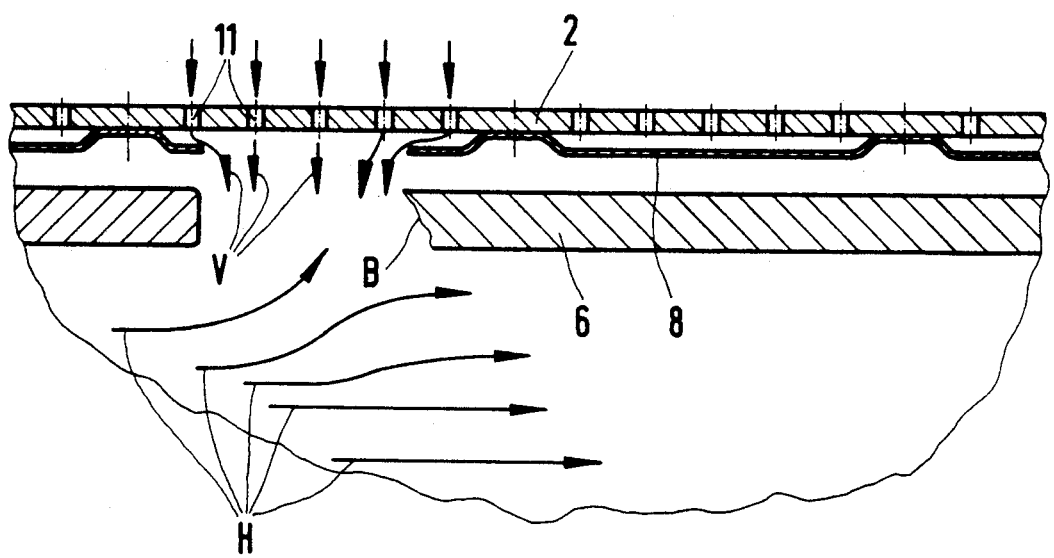

FIG. 6 uses the embodiment of FIG. 2 to illustrate the effects of the invention in the event that a shingle-shaped wall element 6 should break (fracture area B). In that case the hot combustion gases H first impinge on the thin-walled metal skin 8. This area of the metal skin 8 overheats and melts, exposing a number of radial holes 11 in the load-bearing metal wall 2. In a direction indicated by arrowheads V, compressor air issues from these radial holes 11 and enters the combustion space of the flame tube 1 to cool the load-bearing structure in the area of the defective wall element 6 very intensively while keeping the hot combustion gases H away from the metal wall 2. At the next inspection of the combustion chamber, then, the defective wall element 6 and the defective portion of the metal skin 8 can be replaced. Unlike FIG. 1, FIG. 6 shows an embodiment where the hot gas stream H is flowing from the left to the right-hand side.

Figure 7:
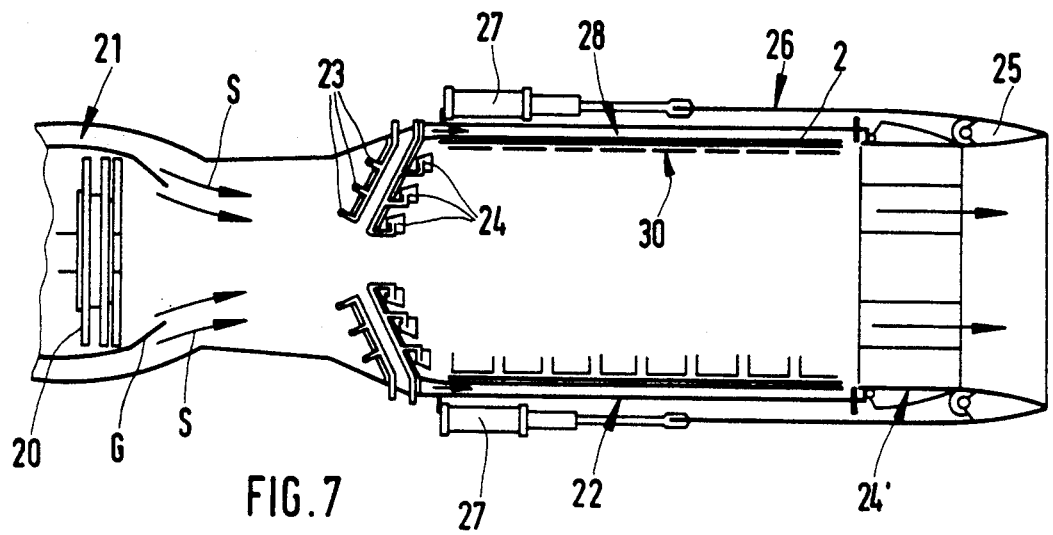
Figure 8:
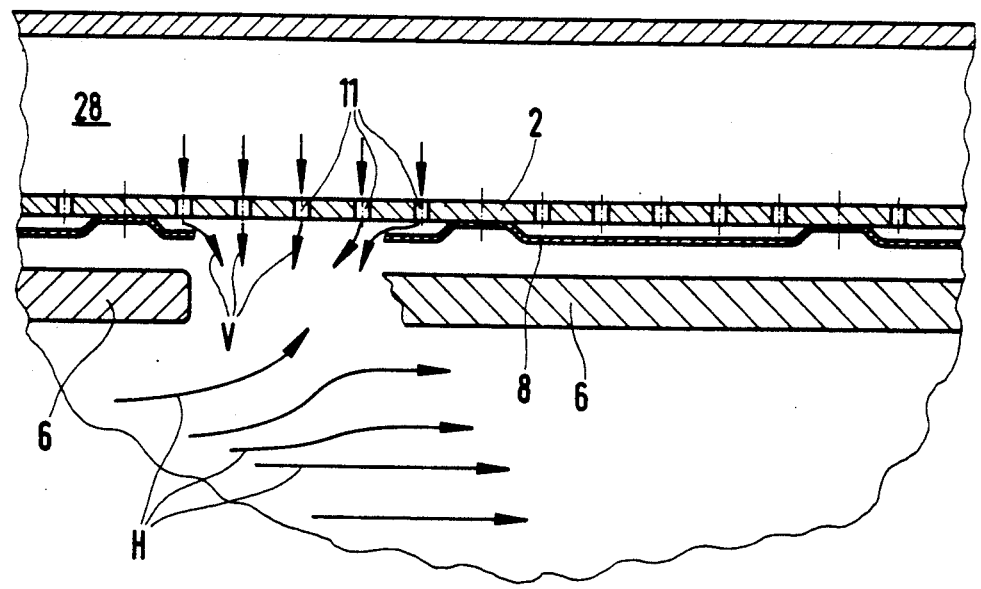

FIGS. 7 and 8 illustrate the use and design of the inventive device on an afterburner of a turbojet engine, where the latter may be a multi-spool bypass engine. In this arrangement the hot gas stream G issuing from the low-pressure turbine 20 mixes with a fan air stream S from a secondary duct 21 and reaches the axially downstream tail pipe 22. For afterburning the hot gas/air mixture in the tail pipe 22, fuel injector rings 23 and flameholders 24 are provided to sustain afterburning, or additional burning, downstream of them.

Arranged at the downstream end of the tail pipe 22 is a variable-geometry nozzle 24' with nozzle flaps 25 that can be positioned about transverse axes by means of an axially displaceable nozzle actuating member 26 operated by externally mounted, lateral, air-operated actuators 27 arranged at a point upstream.

The variable nozzle 24' is used to adapt the effective nozzle exit area to suit the augmented hot gas mass flow when the afterburner is selected.

In accordance with FIGS. 7 and 8 the inventive metal wall 2 forms an axisymmetric inner circumferential wall of the tail pipe 22; formed between the metal wall 2 and the tail pipe wall is an axisymmetric cooling air feed duct 28 energized with relatively cool compressor or fan air flowing from the bypass or secondary air duct 21 along the outer rim zone and out into the cooling air feed duct 28. An inner heat shield 30 of the tail pipe 22 again consists of said inner wall elements 6. The inventive effect of the arrangement in view of FIG. 8, therefore, is identical to that previously described in light of FIG. 6. The previously described inventive alternatives of FIGS. 3, 4 and 5 can analogously be applied also to a tailpipe arranged in accordance with FIG. 7.

Figure 9:
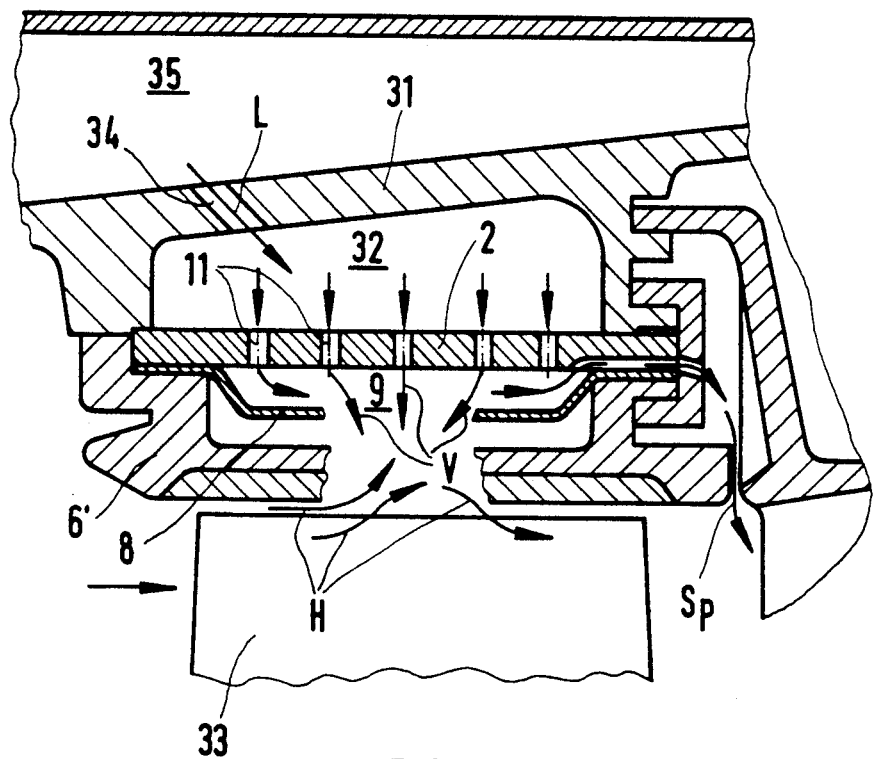

FIG. 9 illustrates an alternative application of the invention as a high-pressure turbine rotor blade shell, where the metal wall 2 is energized with air L taken from the compressor exit through an annulus 32 included between the metal wall 2 and an outer casing wall 31, and where a wall element 6' divided into circumferential segments is facing the tips of rotor blades 33 of the high-pressure turbine in the turbine hot duct. The annulus 32 communicates—through inclined air feed holes 34—with an outer casing annulus 35 energized with cooling or thermal control air taken from the compressor exit. In the event that a shingle-shaped ceramic or other wall element 6' should break, the same effects result as those previously described in light of FIG. 6.

In accordance with FIG. 9 the cooling air exiting from the intermediate space(s) 9 between the metal skin 8 and the metal wall 2 can at least partly be ducted, in normal operation, to the hot gas duct to serve as vent air Sp at a point downstream of the rotor blades 33.

Figure 10:
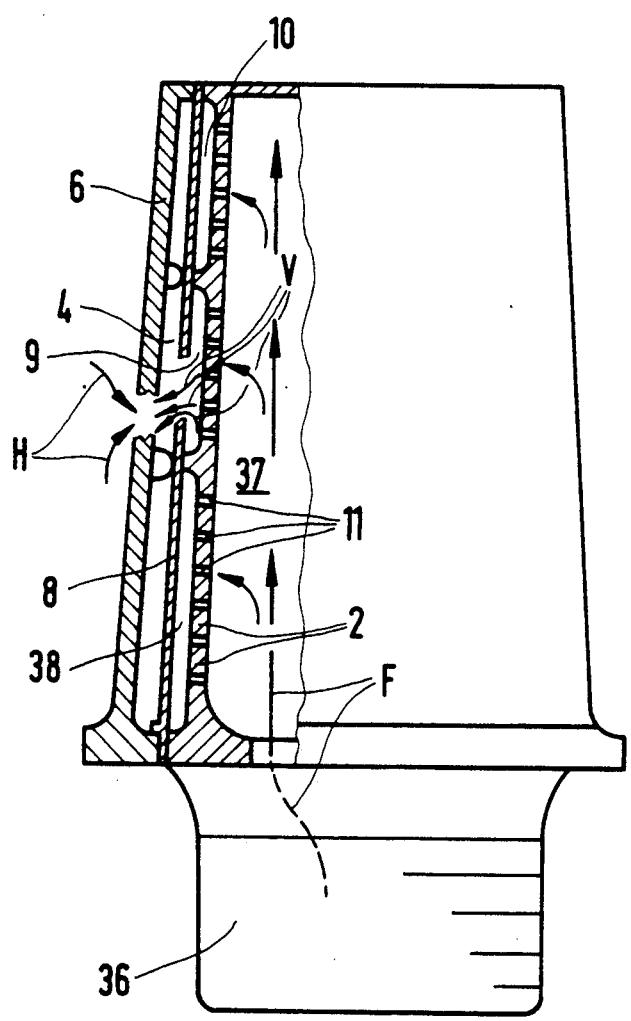

FIG. 10 embodies the invention by means of a gas turbine engine turbine rotor blade cooled with air from the compressor, where the metal wall 2 forms part of the load-bearing metallic core of the blade, where the wall element 6 directly exposed to the hot gas flow H forms the outer blade shell; the cooling air F is here being routed from, e.g., the blade root 36 into a core cavity 37 and from there—through holes 11 in the metal wall 2—to the intermediate spaces 10, 9, 38 formed in at least one cavity 4 formed between the metal wall 2 of the core and the outer wall element 6 by the manner in which the metal skin 8 is arranged on the core-side metal wall 2, the cavity 4 being formed predominantly on the leading edge side.

The advantageous effect of the invention in the event that an outer wall element 6 should break or be damaged is analogous to that previously described for an annular combustion chamber flame tube wall in light of FIG. 6. For the rotor blade of FIG. 10 it is assumed that the cooling air, which normally exits only into the intermediate spaces 10, 9, 38, flows laterally around the exterior of the core in a downstream direction after it has cooled the highly heated leading edge area, and that it then suitably exits through ducts that carry it to the trailing edge of the blade and hence into the hot gas stream.

In the embodiment of FIG. 10 the blade shell (outer wall element 6) can again be made of several replaceable parts, and the highly heated blade shell (wall element 6) can again be made of a suitable ceramic or metallic material.

The rotor blade concept of FIG. 10 would incidentally be practicable in accordance with the present invention also when in normal operation (no damage to the blade shell) the air flow in said intermediate spaces 10, 9, 38 would be standing still, such that the intermediate spaces, as perhaps 9, 10 of the embodiment used in FIGS. 1 to 6, is filled with compressed air taken from the compressor and that the shielding and protective air overflow effect (flow V) will not set in until the shell 6 is damaged.

The inventive concept also embraces the application of the invention to turbine nozzle vanes.

Figure 5:
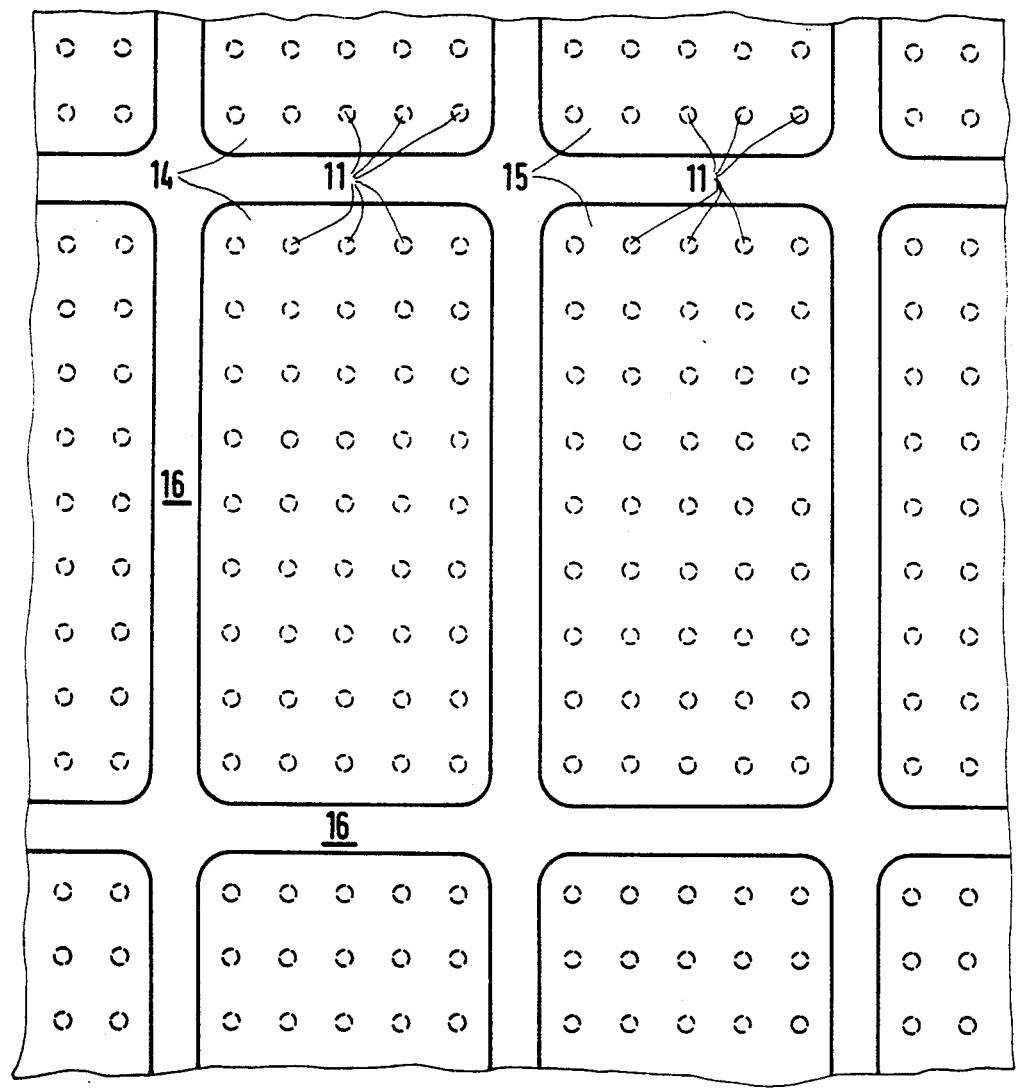

For nozzle vanes and rotor blades in accordance with FIG. 10 alike, there may be several intermediate spaces arranged on the pressure and/or suction side in the same local distribution as previously described and illustrated for the perforation section distribution in light of FIG. 5.

What is claimed is:

1. Device for preventing the scorching of a hot-gas-wetted metal wall of a gas turbine engine or the like, comprising:

highly temperature resistant wall element means disposed between a metal wall and a space subjected to hot gas flow, thin metal skin means disposed between the temperature resistant wall element means and the metal wall, said thin metal skin means lining the metal wall and forming intermediate cooling air space means bounded by the metal wall and the thin metal skin means, and cooling air hole means extending through the metal wall and opening into the intermediate cooling air space means, wherein said thin metal skin means is formed of material having a relatively low melting point such that, upon rupture of said temperature resistant wall element means and consequent communication of hot gas flow to the thin metal skin means, said thin metal skin means is melted to open said cooling air intermediate space means and permit cooling air from said cooling air holes to flow against the flow of hot gases resulting from said rupture and thereby protect the metal wall from scorching.

2. Device according to claim 1, wherein said thin metal skin means is spaced from said wall element means along at least a substantial portion of its surface area which faces said wall element means.

3. Device according to claim 1, wherein said thin metal skin means is locally positively connected to the metal wall at portions of said thin metal skin means determining boundaries of said intermediate cooling air space means.

4. Device according to claim 3, wherein said intermediate cooling air space means includes a plurality of separate cooling air spaces, said cooling air hole means including a plurality of cooling air holes opening into each of said cooling air spaces.

5. Device according to claim 4, wherein said cooling air space means are closed with respect to the wall element means until melted upon rupture of an adjacent portion of the wall element means due to said consequent communication of hot gas flow to the thin metal skin means.

6. Device according to claim 1, wherein said cooling air space means are closed with respect to the wall element means until melted upon rupture of an adjacent portion of the wall element means due to said consequent communication of hot gas flow to the thin metal skin means.

7. Device according to claim 1, wherein said intermediate cooling air space means includes a plurality of separate cooling air spaces, said cooling air hole means including a plurality of cooling air holes opening into each of said cooling air spaces.

8. Device according to claim 7, wherein the cooling spaces are rectangular in shape from one another and are equally spaced over the area of the metal wall.

9. Device according to claim 8, wherein the thin metal skin means is positively connected to the metal wall along boundaries of said cooling spaces.

10. Device according to claim 9, wherein the thin metal skin means is positively connected to the metal wall along outwardly bent portions of the thin metal skin means.

11. Device according to claim 9, wherein the thin metal skin means is positively connected to the metal wall along internally projecting webs of the metal wall.

12. Device according to claim 9, wherein the thin metal skin means is positively connected to the metal wall by way of intermediate space means.

13. Device according to claim 12, wherein said intermediate space means are spacer plates or strips.

14. Device according to claim 1, wherein said thin metal skin means is attached to the metal wall by welding means.

15. Device according to claim 1, wherein said thin metal skin means is attached to the metal wall by brazing means.

16. Device according to claim 1, wherein said thin metal skin means is attached to the metal wall by rivet means.

17. Device according to claim 1, wherein said wall element means includes at least one wall element in the form of a shingle or scale-like hot gas shield element made of a highly temperature resistant metallic or ceramic material.

18. Device according to claim 17, wherein said thin metal skin means is secured in place without contacting said at least one wall element.

19. Device according to claim 1, wherein the metal wall is a load-bearing outer or inner wall of a flame tube of an annular combustion chamber of a gas turbine engine, and is supplied with cooling air taken from a high-pressure compressor exit through an outer or inner annular secondary air duct formed between outer casing structure components and the flame tube.

20. Device according to claim 19, wherein the wall element means for the inner hot gas shield is broken down into several individual wall elements that are spread in axial and/or circumferential direction and have spaces allowed between their respective abutting ends.

21. Device according to claim 1, wherein the metal wall is a radially spaced-apart inner circumferential wall of a tail pipe for an afterburner of a gas turbine engine, and wherein said wall element means take the form of a shingle- or scale-like heat shield.

22. Device according to claim 1, wherein the metal wall is an outer high-pressure turbine rotor blade shell and is energized with air taken from a compressor exit through an annulus enclosed between the metal wall and an outer casing wall, and wherein the wall element means are divided into circumferential segments and face rotor blade tips of a high-pressure turbine in a turbine hot gas duct.

23. Device according to claim 1, wherein the metal wall forms part of load-bearing metallic core of a blade for a gas turbine engine turbine nozzle vane or rotor blade cooled with air taken from a compressor, wherein the directly hot gas wetted wall element forms an outer blade shell, and wherein the cooling air is ducted from an interior of the blade core to the intermediate spaces through perforated sections in the metal wall, said intermediate spaces being formed in at least one cavity between the metal wall of the core and the outer wall element on account of the arrangement of the metal skin on the metal wall on the core side.

24. Device according to claim 1, wherein the melting point of the material forming the thin skin means is equal to or lower than the melting point of the material forming the metal wall.

25. Device according to claim 1, wherein the melting point of the material forming the thin metal skin means is lower than the melting point of the material forming the metal wall.

26. A device according to claim 1, further comprising air chamber means surrounding said metal wall and being supplied by compressed air from a turbine engine, said compressed air serving as said cooling air which is permitted to flow through said cooling air holes against the flow of hot gases resulting from said rupture.

27. Device for preventing the scorching of a hot-gas-wetted metal wall of a gas turbine engine or gas turbine jet engine respectively comprising:
   highly temperature resistant wall element means disposed between a metal wall and a space subjected to hot gas flow,
   thin metal skin means disposed between the temperature resistant wall element means and the metal wall, said thin metal skin means lining the metal wall and forming intermediate air space means bounded by the metal wall and the thin metal skin means,
   a plurality of air holes extending in axial and circumferential direction through the metal wall and opening into the intermediate air space means,
   and air chamber means surrounding said metal wall and being supplied by compressed air from said turbine engine,
   wherein said thin metal skin means is formed of material having a relatively low melting point such that, upon rupture of said temperature resistant wall element means and consequent communication of hot gas flow to the thin metal skin means, said thin metal skin means is melted to open said intermediate air space means and permit compressed air from said air chamber means to flow through said air holes and thus serving for highly energized flow of cooling air against the flow of hot gases resulting from said rupture and thereby shielding and protecting the metal wall from scorching.

* * * * *